United States Patent
Larsen et al.

(10) Patent No.: US 8,081,923 B1
(45) Date of Patent: Dec. 20, 2011

(54) METHOD AND APPARATUS FOR PROVIDING LOCATION SERVICES FOR A DISTRIBUTED NETWORK

(75) Inventors: Tormod Larsen, Geneva, IL (US); Antonio Rivas, Elmhurst, IL (US)

(73) Assignee: Extenet Systems Inc., Lisle, IL (US)

( * ) Notice: Subject to any disclaimer, the term of this patent is extended or adjusted under 35 U.S.C. 154(b) by 534 days.

(21) Appl. No.: 11/958,100

(22) Filed: Dec. 17, 2007

Related U.S. Application Data

(63) Continuation-in-part of application No. 11/674,370, filed on Feb. 13, 2007.

(51) Int. Cl.
*H04B 7/14* (2006.01)
(52) U.S. Cl. .................................... 455/18; 455/404.2
(58) Field of Classification Search ............... 455/404.2, 455/404.1, 67.16, 423, 7, 10, 16, 18, 502, 455/67.11, 456.5, 561, 562.1, 456.1, 14
See application file for complete search history.

(56) References Cited

U.S. PATENT DOCUMENTS

| | | | |
|---|---|---|---|
| 6,178,334 B1 | 1/2001 | Shyy et al. | |
| 7,047,028 B2 | 5/2006 | Cagenius | |
| 7,450,520 B2 * | 11/2008 | Bernier et al. | 370/246 |
| 7,493,129 B1 * | 2/2009 | Mostafa et al. | 455/502 |
| 2003/0222819 A1 * | 12/2003 | Karr et al. | 342/457 |
| 2003/0226071 A1 | 12/2003 | Millar | |
| 2004/0038683 A1 | 2/2004 | Rappaport et al. | |
| 2005/0037775 A1 | 2/2005 | Moeglein et al. | |
| 2006/0276202 A1 | 12/2006 | Moeglein et al. | |

OTHER PUBLICATIONS

Office Action in U.S. Appl. No. 11/674,370 mailed Sep. 2, 2009.
Office Action in U.S. Appl. No. 11/674,370 mailed May 10, 2010.
International Search Report in PCT/US08/153814 dated Jul. 22, 2008.
Office Action in U.S. Appl. No. 11/674,370 mailed Mar. 29, 2011.

* cited by examiner

*Primary Examiner* — Tu X Nguyen
(74) *Attorney, Agent, or Firm* — McDonnell Boehnen Hulbert & Berghoff LLP

(57) ABSTRACT

A method and system for normalizing various simulcasting nodes within a distributed antenna system (DAS) simulcast sector uses the simulcast sector's known fiber delays, the distance between the nodes, and its corresponding RF delays. The methodology includes adding calculated delays to the known fiber delays to normalize each node's delay. Each normalized node delay value is equal to the value of the fiber delay of the furthest node plus the respective RF delay distance from that node.

18 Claims, 8 Drawing Sheets

METHOD AND APPARATUS FOR PROVIDING LOCATION SERVICES FOR A DISTRIBUTED NETWORK

CROSS-REFERENCE TO RELATED APPLICATIONS

This application is a continuation-in-part of and claims the benefit of U.S. Non-Provisional patent application Ser. No. 11/674,370 filed on Feb. 13, 2007 and entitled "A Method and Apparatus for Providing Location Services for a Distributed Network," which is incorporated herein by reference in its entirety.

FIELD

This patent generally relates to field of telecommunications and specifically to the field of wireless radio frequency communication systems.

BACKGROUND

In the reception and handling of 911 emergency telephone calls, it is important to be able to automatically pinpoint the location of a caller; e.g. an anxious or hysterical caller unable to tell his or her location, or a caller that does not know his/her location and has no visible landmarks that could be used to fully identify such. In calls over ordinary telephone sets directly linked by wire to the Public Switched Telephone Network (hereafter, PSTN), it is possible to trace the number of the telephone from which the call is placed and use that information to locate the caller, since the calling device or unit is associated with a known "building" address from which the caller's location is easily implied or determinable.

However, such fixed or predefined location is not available when the respective calling unit is mobile; e.g. a cellular telephone, "2-way" pager" or other wireless device. Mobile units of this kind generally link to the PSTN through a network of geographically dispersed antennas, base stations and switching offices. Although such units have an identity which is signaled during a call, that identity neither implies their physical location nor forms a basis for calculating it. Furthermore, even if the locations of the antennas and distances between them are known, that information per se does not form a basis for determining the location of a unit with which they are currently communicating. Such fixed or predefined location might not be available if the call/request is made through a network where such "building" address is not documented (i.e. IP based networks).

The federal communications commission (FCC) has specific requirements for wireless 911 calls. These requirements are divided into two parts—Phase I and Phase II. Phase I requires carriers, upon valid request by a local public safety answering point (PSAP), to report the telephone number of a wireless 911 caller and the location of the cell sector that received the call.

Phase II requires wireless carriers to provide far more precise location information. For carriers that have implemented a handset solution, the FCC requirement is that 67% of the calls are accurate to within 50 meters, and 95 percent of the calls are accurate to within 150 meters. For a network-based solution, the requirement is that 67% of the calls are accurate to within 100 meters, and 95 percent of the calls are accurate to within 300 meters. In response to such regulatory requirements, there is a need to provide a method and system for providing 911 services in a wireless communication system.

Future networks and technologies are anticipated to support location based services beyond E911 calls. Such applications might include location-based advertising, location of relatives, integrated mapping services etc. Therefore, there is a need for networks that can support accurate location of the user.

In code division multiple access (CDMA) networks, all sites are synchronized so the code sequences begin at the same time. When a fiber fed distributed antenna system (DAS) network is introduced to a CDMA network, the fiber delay impacts the synchronization for that network. With any DAS network that has simulcast nodes, care must be taken to ensure the fiber delays and differential fiber delays between the nodes are taken into account. The following three CDMA parameters must be used to ensure the delays are accounted for:

Tx Delay—the propagation delay on the transmission (Tx) path between the CE (Channel Element) and the first node of the simulcast sector Rx Delay—the propagation delay on the reception (Rx) path between the CE and the first node of the simulcast sector Max Differential Delay—this is the delay difference between the first and the last node of the simulcast sector These parameters normalize the delays of the fiber transport to allow the data to fall into synchronized search windows for the mobiles serving in the simulcast coverage area. Without utilizing these parameters, the Tx and Rx data transmitted by the simulcast sector will fall outside the search window.

Although accounting for the fiber delays on the simulcast sector using the parameters works for communicating with mobiles in the simulcast serving area, there is still an inherent accuracy problem for location base services and E911. Whenever the location calculation reverts to triangulation in order to determine a mobile's location, it requires a reference latitude/longitude and calculates the mobiles distance based on timing and the reference latitude/longitude. With a DAS simulcast sector, this reference latitude/longitude can be miles from the actual mobile location, yet the calculation of the RF delay for triangulation purposes will show the distance of the mobile to be at a closer distance due to its proximity to a nearby simulcasting node and not the actual reference location. Therefore, there is a need for a system that normalizes all simulcasting nodes.

BRIEF DESCRIPTION OF THE DRAWINGS

While the appended claims set forth the features of the present patent with particularity, the patent, together with its objects and advantages, may be best understood from the following detailed description taken in conjunction with the accompanying drawings, of which:

DETAILED DESCRIPTION

Figure 1:
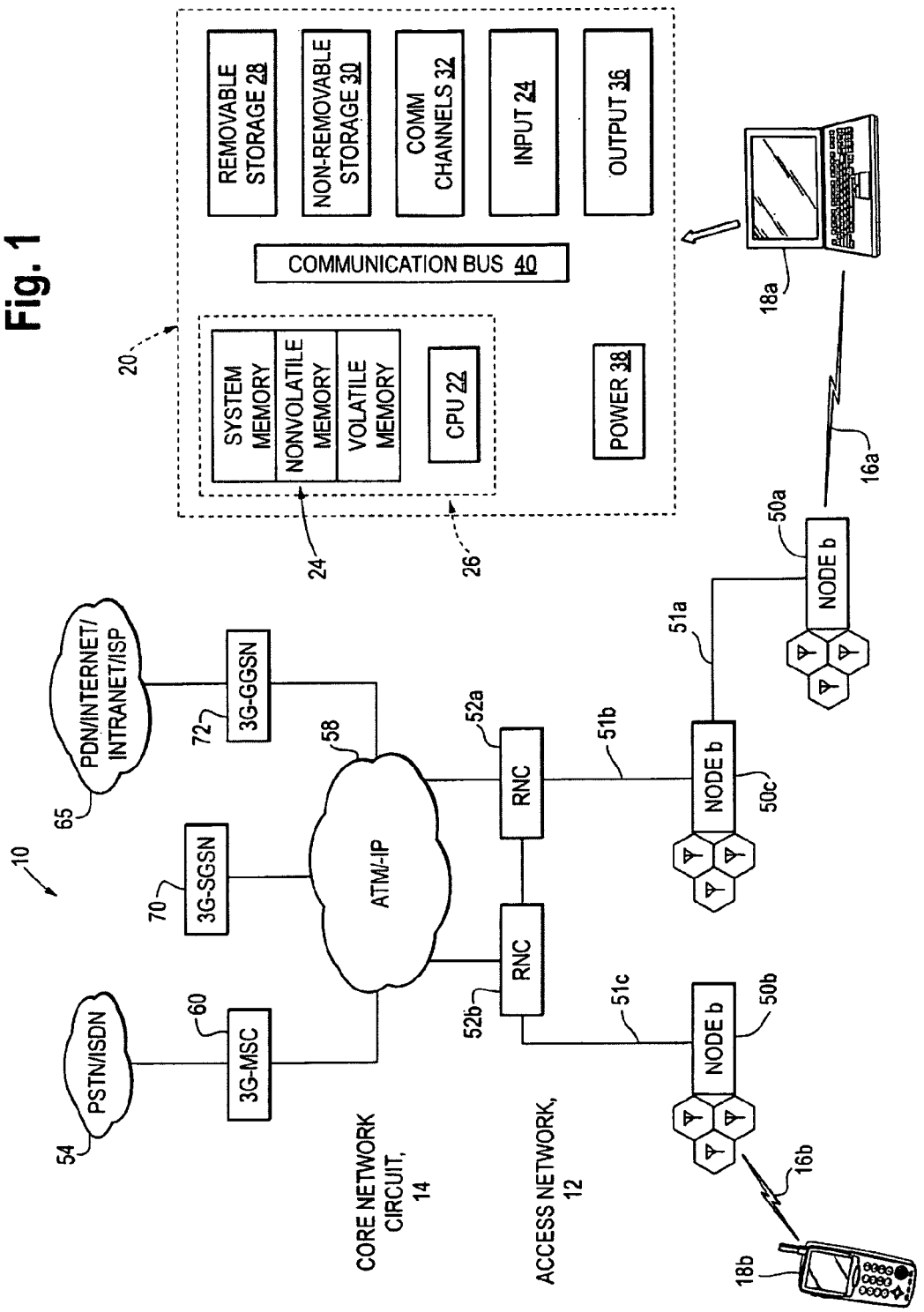
FIG. 1 illustrates an example block diagram of a network that may be used to implement an embodiment of the distributed antenna system (DAS) with enhanced 911 (E911) capabilities, in a manner as described herein.

A method and system for providing enhanced 911 (E911) location services for a distributed antenna system uses a lookup table including round trip delay (RTD) ranges for a number of nodes of the distributed antenna system to determine a serving node for an E911 call. The method and system disclosed herein, may calculate such lookup table based on the values of the fiber delays and air delays for each node on the distributed antenna system. After determining the serving node for an E911 call, the system may use triangulation method to determine the exact location of the wireless unit generating the E911 call.

A method and system for normalizing various simulcasting nodes within a distributed antenna system (DAS) simulcast sector uses the simulcast sector's known fiber delays, the distance between the nodes, and its corresponding RF delays. The methodology includes adding calculated delays to the known fiber delays to normalize each node's delay. Each normalized node delay value is equal to the value of the fiber delay of the furthest node plus the respective RF delay distance from that node.

In the description that follows, various components/implementations of wireless communication systems are described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the computing device in a manner well understood by those skilled in the art. The data structures where data are maintained are physical locations of the memory that have particular properties defined by the format of the data. However, while the patent is being described in the foregoing context, it is not meant to be limiting as those of skill in the art will appreciate that several of the acts and operations described hereinafter may also be implemented in hardware.

Turning to the drawings, wherein like reference numerals refer to like elements, the patent is illustrated as being implemented in a suitable networking environment. The following description is based on illustrated embodiments of the patent and should not be taken as limiting the patent with regard to alternative embodiments that are not explicitly described herein.

Network and Computer

FIG. 1 illustrates a block diagram of a network 10 that may be used to implement the system and method described herein. Each node of the network 10 may reside in a device that may have one of many different computer architectures. For descriptive purposes, FIG. 1 shows a schematic diagram of an exemplary architecture of a computing device 20 usable at any of the various devices connected to the network 10. The architecture portrayed is only one example of a suitable environment and is not intended to suggest any limitation as to the scope of use or functionality of various embodiments described herein. Neither should the computing devices be interpreted as having any dependency or requirement relating to any one or combination of components illustrated in FIG. 1. Each of the various embodiments described herein is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, the computing device 20 typically includes at least one processing unit 22 and memory 24. The memory 24 may be volatile (such as RAM), non-volatile (such as ROM and flash memory), or some combination of the two. This most basic configuration is illustrated in FIG. 1 by the dashed line 26. The computing device 20 may also contain storage media devices 28 and 30 that may have additional features and functionality. For example, the storage media devices 28 and 30 may include additional storage (removable and non-removable) including, but not limited to, PCMCIA cards, magnetic and optical disks, and magnetic tapes. Such additional storage is illustrated in FIG. 1 by the removable storage 28 and the non-removable storage 30.

Computer-storage media may include volatile and non-volatile, removable and non-removable media implemented in any method or technology for storage of information such as computer-readable instructions, data structures, program modules, or other data. Memory 24, removable storage 28, and non-removable storage 30 are all examples of computer-storage media. Computer-storage media include, but are not limited to, RAM, ROM, EEPROM, flash memory, other memory technology, CD-ROM, digital versatile disks, other optical storage, magnetic cassettes, magnetic tapes, magnetic disk storage, other magnetic storage devices, and any other media that can be used to store the desired information and that can be accessed by the computing device. For example, such computer-storage media may be used to store a lookup table for the 911 system as described below.

The computing device 20 may also contain communication channels 32 that allow it to communicate with other devices. Communication channels 32 are examples of communications media. Communications media typically embody computer-readable instructions, data structures, program modules, or other data in a modulated data signal such as a carrier wave or other transport mechanism and include any information-delivery media. The term computer-readable media as used herein includes both storage media and communications media. The computing device 20 may also have input components 34 such as a keyboard, mouse, pen, a voice-input component, and a touch-input device. Output components 36 include screen displays, speakers, printers, and rendering modules (often called "adapters") for driving them. The computing device 20 has a power supply 38. Various components of the computing device may communicate with each other via an internal communications bus 40. All these components are well known in the art and need not be discussed at length here.

The network 10 may be a conventional network, which can be divided into a radio access network (RAN) 12 and a core network (CN) 14. The RAN 12 may comprise the equipment used to support wireless interfaces 16a-b between wireless units 18a-b and the network 10. The RAN 12 may include Nodes or base stations 50a-c connected over links 51a-c to radio network or base station controllers 52a-b.

The core network 14 may include network elements that support circuit-based communications as well as packet-based communications. In establishing a circuit channel to handle circuit-based communications between the wireless unit 18b and a public switched telephone network (PSTN) 54 or another wireless unit, the base station 50b may receive (in the uplink) and transmits (in the downlink), the coded information (circuit voice or circuit switched data) over the wireless interface or link 16b. The RNC 52b is responsible for frame selection, encryption and handling of access network mobility. The RNC 52b may also forward the circuit voice and circuit switched data over a network, such as an ATM/IP network to a 3G mobile switching center (MSC) 60. The 3G-MSC 60 is responsible for call processing and macro-mobility on the MSC level. The 3G-MSC 60 establishes the connectivity between the wireless unit 18b and the PSTN 24.

E911 Location System

As discussed above, the FCC has specific requirements for locating wireless 911 calls.

The methods used to determine the location of a wireless caller might vary based on network architecture and preferences. The position determining entity (PDE) might be using information derived either from the network, from the user terminals or from both. Solutions that depend on enhanced user terminals/handsets, are often referred to as handset-based solutions. Solutions that are not relaying on enhanced user terminals/handsets are often referred to as network based solutions. There also exists hybrids solutions between handset and network-based solutions.

Uplink time differential of arrival (U-TDOA) is an example of a commonly used network based solution. The Uplink Time Difference of Arrival (U-TDOA) method calculates the location of a handset by using the difference in time of arrival of signals at different receivers. The handset or device could be a standard mobile phone or other wireless device, such as a PDA, wireless modem, or personal location device. A U-TDOA system does not require any changes in the handset but instead involves specialized receivers that are added to each base station in the wireless network. These receivers contain very accurate, GPS-based clocks to make it possible to resolve time differences very precisely. The method uses existing cell towers, radio antennas, and infrastructure. The U-TDOA method calculates the location of a transmitting phone by using the difference in time of arrival of signals at different receivers known as Location Measurement Units (LMUs). The mobile phone transmits a signal that is received by different receivers at times that are proportional to the length of the transmission path between the mobile phone and each receiver. The U-TDOA method does not require knowing when the mobile phone transmits; rather, it uses the time difference between pairs of LMUs as the baseline measurement, generating hyperbolic plots that represent all possible distances of the handset from each receiver. The intersection of three or more such hyperbolas locates the position of the transmitting phone or device. The U-TDOA system uses timing data from as many receiving antennas, enabling a high accuracy for network-based system.

In a wireless network using handset-based solution the wireless devices need to have incorporated an A-GPS (Assisted Global Positioning System) receiver capable of receiving and processing signals transmitted by orbiting GPS satellites. The calculations involved in this technology require a highly accurate knowledge of the position in space of particular satellites at the moment the GPS phone receives the signals. By combining the time the signal reaches the receiver with knowledge of the transmitter's position in space, it is possible to estimate the distance from the satellite to the handset. By making four or more such measurements, it is possible to "triangulate" and find the precise location of the handset. Since the database containing satellite positions and timing is very large, it would be infeasible to contain that information within the phone. Therefore, A-GPS uses a separate server (with its own GPS receiver) at a precisely known location. This server communicates the information to the MS to help it in its calculations of estimated distances from satellites; hence the term "assisted" GPS. This explanation of A-GPS is necessarily simplified and excludes multiple sources of error or reduced confidence.

For example, in rural areas with unblocked visibility of the sky, location errors can be reduced to a few meters, provided sufficient time is available in which to process satellite signals. The more satellites, and the more time used, the greater the accuracy and vice versa. In dense urban conditions, where the line of sight to satellites may be obstructed by tall buildings or where the caller is inside a building, accuracy drops off rapidly and required integration time increase.

If no satellites are visible, the location server utilizes Advanced Forward Link Trilateration (AFLT), as a fallback solution. To determine location, the phone takes measurements of signals from nearby cellular base stations and reports the time/distance readings back to the network, which are then used to triangulate an approximate location of the handset. In general, at least three surrounding base stations are required to get an optimal position fix. In a typical scenario, the mobile will make a 911 call and the network server will utilize the sector's latitude and longitude information, which is already loaded in its data base, to calculate the location using the AFLT/AGPS algorithm.

Figure 2:
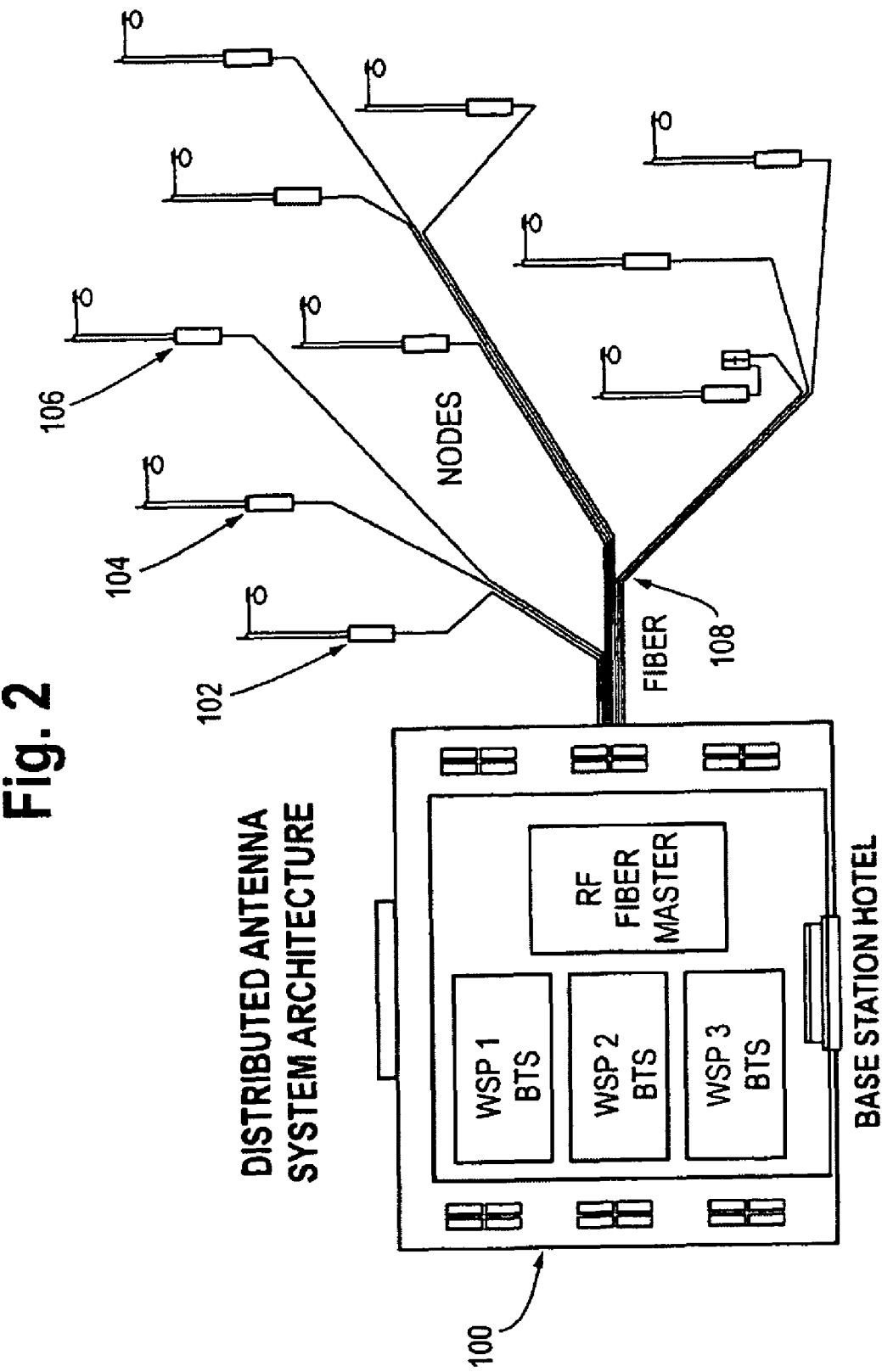
FIG. 2 illustrates an example block diagram of a distributed antenna system.

However, when implementing an outdoor DAS or other distributed network, the ability to provide accurate location information is impacted by the fact that the base station can be miles away from simulcasting antenna nodes from which a mobile is communicating a 911 call or making a location request. In such a case, the signal may be propagating through fiber or another medium with a higher propagation delay. The network connecting the nodes to the centralized base station might also take a route that further increase the delay between the nodes and the centralized base station. To illustrate this, FIG. 2 illustrates an example block diagram of a distributed antenna system. The DAS network of FIG. 2 includes a base station hotel 100 that communicates with a plurality of remote nodes 102, 104, 106, etc. The base station 100 may communicate with such remote nodes using fiber optic communication cables 108. In an implementation, the remote nodes may be located on utility poles located on a neighborhood, etc.

Figure 3:
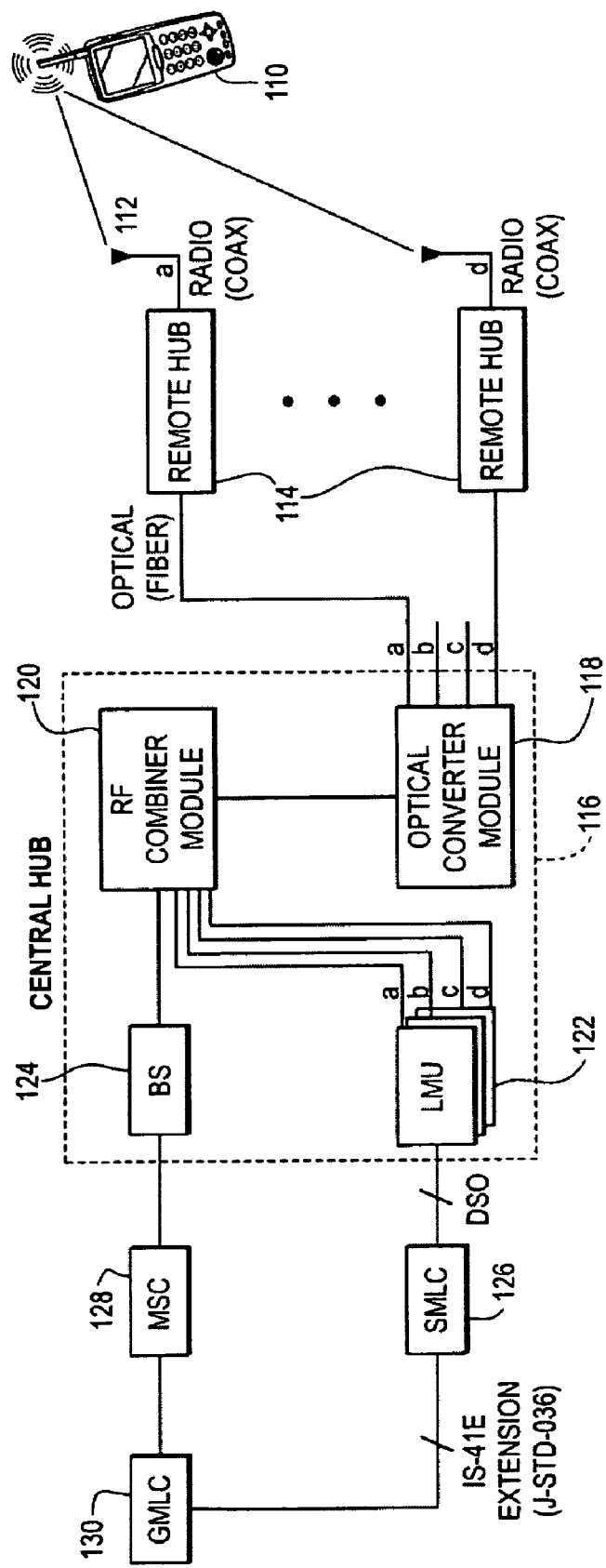
FIG. 3 illustrates an example block diagram of a time difference of arrival (TDOA) system for determining location of a wireless device generating a 911 call.

The increased propagation delay introduces challenges associated with using the TDOA system as described in FIG. 3 or the AFLT system with a distributed antenna system (DAS). TDOA and AFLT assume that the radio signal is propagating the shortest distance between the base station and the user/handset, and at the speed of light. The measured delay between the base station and user/handset is then used to calculate the distance. These measurements are utilized in the triangulation algorithm as described above.

When using a DAS network, the ability to provide accurate location information is impacted due to the fact that it is not a direct correlation between the air distance and the delay from the base station to a given node. The fact that multiple nodes can be simulcasted off the same base station sector makes the situation even more complex. Therefore, when a 911 call is placed from within the DAS coverage area, an error is introduced when calculating the location of a mobile device as the latitude/longitude information in a location server database is that of the sector, and not of the serving node.

Figure 4:
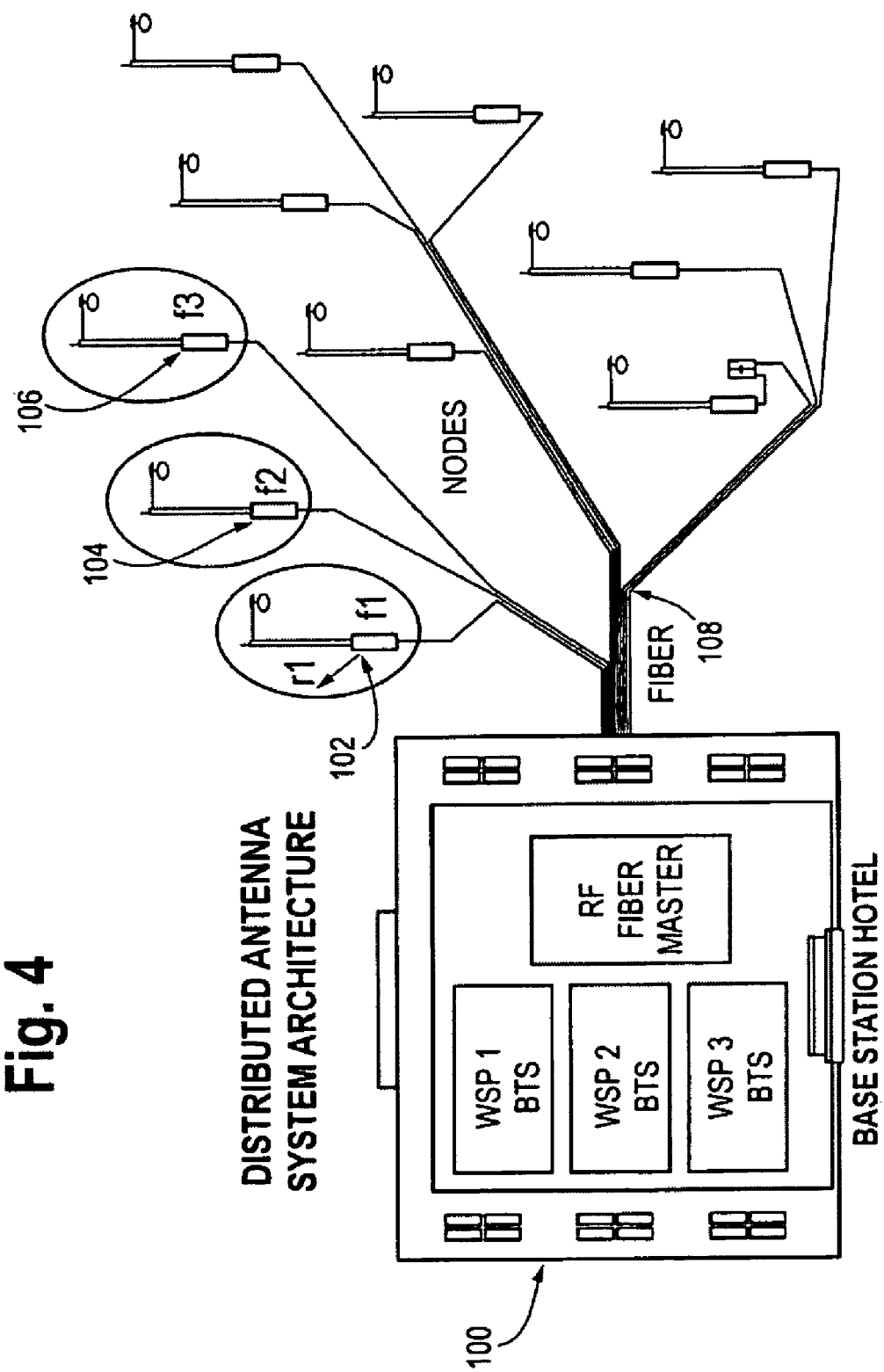
FIG. 4 illustrates an alternate view of the DAS network of FIG. 2 using an alternate method to calculate round trip delay (RTD)

To overcome the shortcomings of the AFLT and TDOA systems discussed above when used with a DAS network, a method and system described herein uses round trip delay (RTD) associated with each of the various nodes in a DAS network. Such a method and system is described below with respect to FIG. 4. In FIG. 4 each of the nodes 102-106 are respectively located at fiber distances of f1-f3 from the base station hotel 100. It is supposed that the range of the node 102 is up to a distance of r1.

To determine the round trip delay (RTD) associated with each node, the fiber delays and air delays associated with each node are calculated and stored in a lookup table. For example, the fiber delays associated with node n1 is the time it takes for a signal to travel from the base station hotel to the node n1, specified herein as f1. Because the speed of an optical signal traveling in the fiber is known, generally to be 8 microseconds per mile, if the length of the fiber from the base station hotel to the node 1 is known such fiber delay can be calculated by multiplying such fiber travel speed with the length of the fiber to node n1. Similarly the fiber delays to each of the other nodes in the DAS network may also be calculated.

The minimum air delay for any DAS node can be approximately designated to be zero microseconds, assuming that the mobile device is located in immediate vicinity of the node. The maximum air delay associated with any such DAS node may be assumed to be equal to the time necessary for a signal to travel from such DAS node to the outer periphery of its coverage area. For example, if the maximum coverage distance of a DAS node is d1 and the speed of signal communicating in the air is 5 microseconds per mile, the maximum air delay r1 associated with DAS node 1 may be calculated as the maximum coverage distance of a DAS node is dl multiplied by the speed of air travel.

Subsequently, the minimum and the maximum RTDs associated with node 1 may be calculated to be 2f1 and 2f1+2r1, respectively. The table 1 below provides such minimum and maximum RTDs for the nodes 1-3 illustrated in FIG. 4, assuming that the delay rate of the RF signal traveling in the fiber is 5 microseconds per kilometer (8 microseconds per mile) and the delay rate of the RF signal traveling in the air is approximately 3 microsecond per kilometer (5 microseconds per mile).

TABLE 1

|  | Fiber Distance Between Nodes (km) | Fiber Distance from BTS Hub | Coverage Radius (km) | Delay Min (μ sec) | Delay Max (μ sec) | Delay Window Size (μ sec) |
|---|---|---|---|---|---|---|
| Node 1 | 1.5 | 1.5 | 0.6 | 7.5 | 9.3 | 1.8 |
| Node 2 | 0.75 | 2.25 | 0.5 | 11.25 | 12.75 | 1.5 |
| Node 3 | 1 | 3.25 | 0.6 | 16.25 | 18.05 | 1.8 |
| Node 4 | 0.75 | 4 | 0.5 | 20 | 21.5 | 1.5 |
| Node 5 | 0.75 | 4.75 | 0.5 | 23.75 | 25.25 | 1.5 |
| Node 6 | 1 | 5.75 | 0.6 | 28.75 | 30.55 | 1.8 |
| Node 7 | 1.25 | 7 | 0.75 | 35 | 37.25 | 2.25 |
| Node 8 | 1 | 8 | 0.5 | 40 | 41.5 | 1.5 |

As shown above a look-up table may be created for each of the nodes on the DAS network. Such a table may be saved at a 911 server to be used by the PDE and associated databases in the calculation of mobile devices' location. Once a 911 server receives a service cell sector of the mobile device that is generating a 911 call, the 911 server may do an additional lookup based on the time/distance measurements from the mobile. Depending on this value, the server can determine (with some additional data loaded into the database and based on the DAS configuration) which node is the serving node for the mobile device and utilize the node's latitude/longitude for further location calculations. For example, if the value were 17 μs, the latitude and longitude from node 3 would be utilized for any further location calculations.

Once the 911 server determines the node serving the mobile device related to the 911 call, the 911 server can triangulate between nodes of the DAS network or between the nodes and other sectors to determine the approximate location of the mobile device. Such a method of using a lookup table to determine the location of mobile device does not require any additional hardware or expensive additional software to implement.

Figure 5:
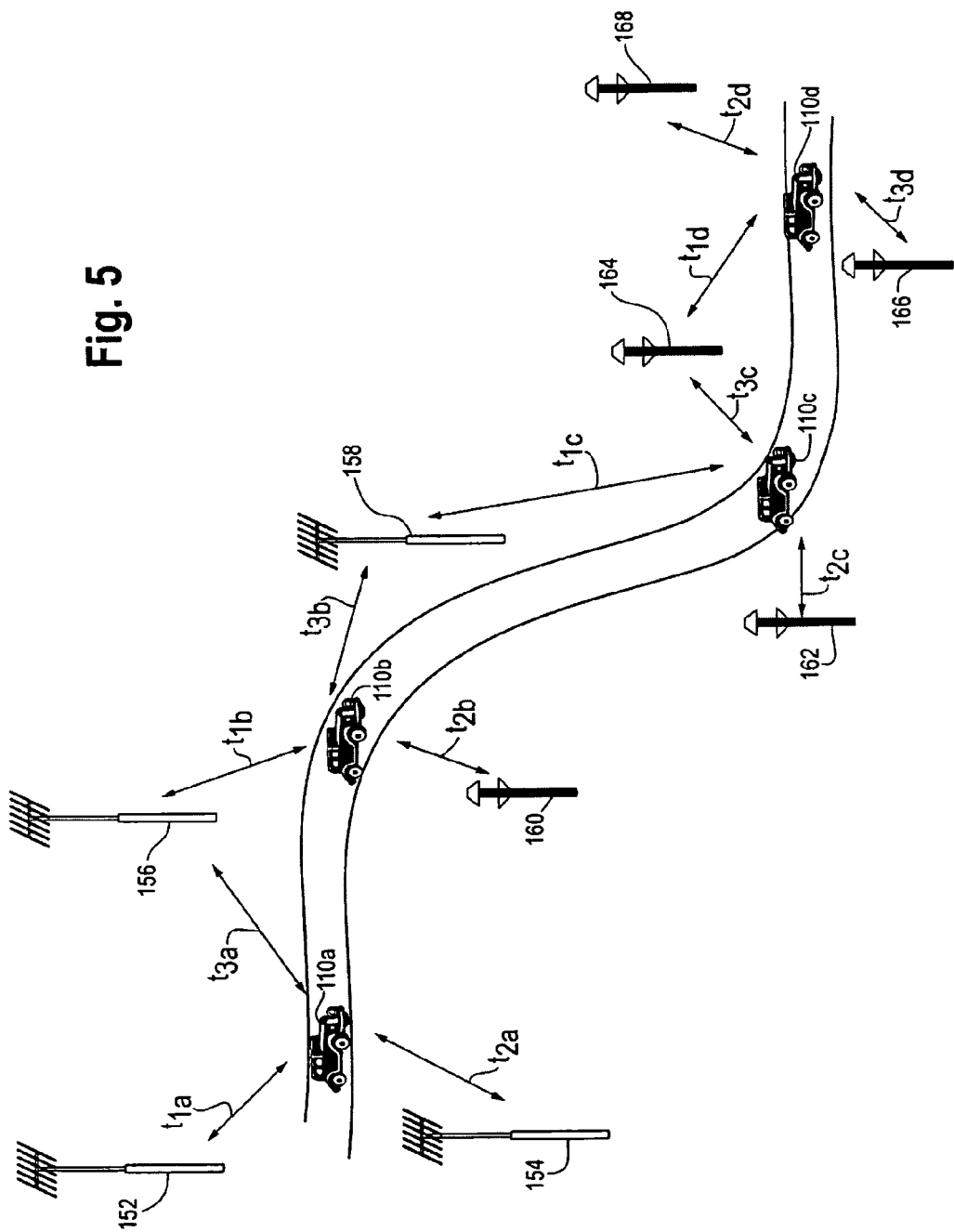
FIG. 5 illustrates a block diagram of a network of base stations and DAS nodes using the method described herein to calculate RTD.

Now referring specifically to FIG. 5, it illustrates a triangulation using a combination of base transmission stations (BTSs) and DAS nodes. The triangulation is illustrated for a user 110 traveling with a mobile device and using the triangulation at various locations 110a-d. For example, when the user is at location 110a, he is in the vicinity of three BTSs 152-156. In this location, the distance between the user's mobile device and the three BTSs 152-156 is $t_{1a}$, $t_{2a}$ and $t_{3a}$ respectively. In that case, conventional triangulation method is used to determine the location of the user.

When the user is at location 110b, he may be in the vicinity of BTSs 156 and 158 and a DAS node 160. In this situation, the distance between the user and BTS/DAS 156-160 may be $t_{1b}$, $t_{2b}$ and $t_{3b}$, respectively. The distance between the user and the DAS node 160 is determined using the RTD calculation method described herein. Subsequently, when the user is at location 110c, he may be in vicinity of BTS 158 and DAS nodes 162, 164. In this situation the distances between the user's mobile device and the DAS nodes 162, 164, namely $t_{2c}$ and $t_{3c}$, may be determined using the RTD calculation method described herein. Finally, when the user is at location 110d, he is in the vicinity of only DASs, namely DASs 164, 166 and 168. In this situation the location of the user's mobile device will be determined using the distances $t_{1d}$, $t_{2d}$ and $t_{3d}$, all of which are determined using the RTD calculation method described herein.

Figure 6:
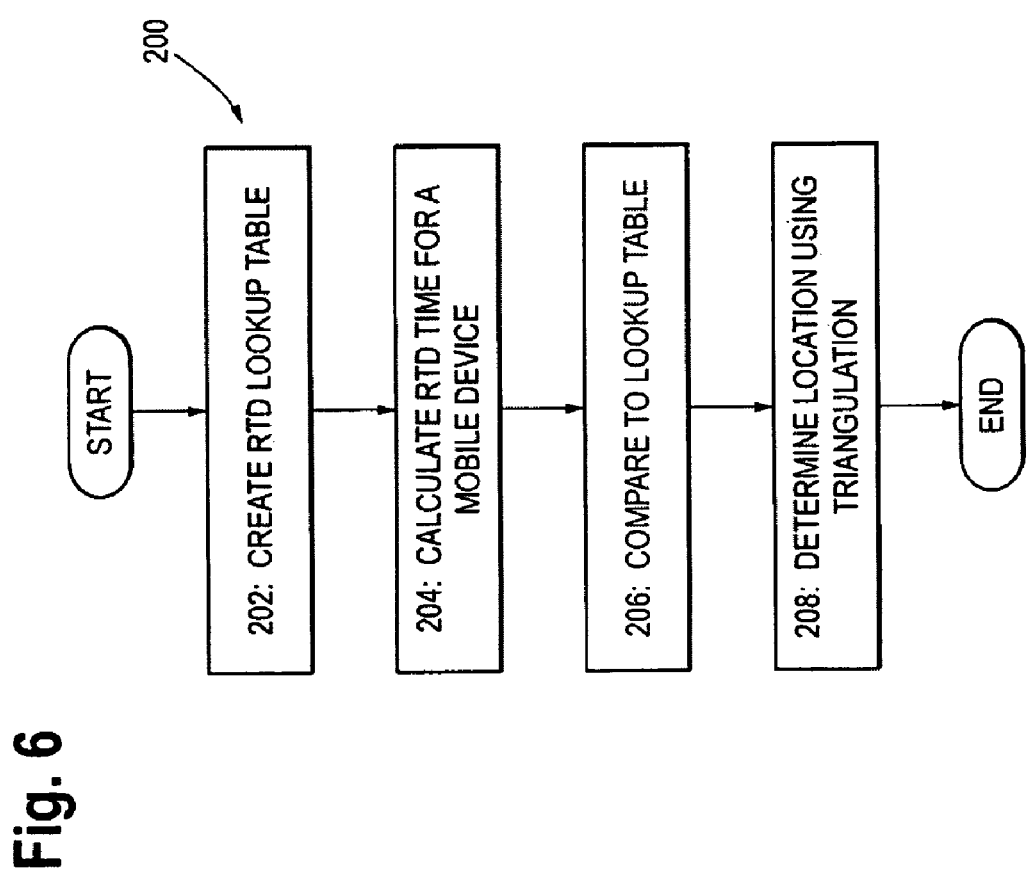
FIG. 6 illustrates a block diagram of the method used for providing location of a mobile device as illustrated herein.

Now referring to FIG. 6 a flowchart 200 of a method of using a lookup table to determine a DAS node serving a mobile device. A block 202 determines the lookup table. Such a block 202 may be implemented at the base station hotel 100 or at the central hub 116, or at any other location communicatively connected to the DAS network. Subsequently, a block 204 calculates RTD times for a mobile device that has generated a 911 call. For example, the block 204 may determine the RTD time by transmitting a signal to the mobile device from the base station hotel 100, receiving a response to the mobile device and then calculating the RTD. Subsequently, a block 206 compares the observed RTD to the lookup table to see which serving node is associated with the mobile device. Finally, as discussed above a block 208 determines the location of the mobile device using triangulation method.

It would be obvious to one of ordinary skill in the art that in an alternate embodiment, the solution described here may also be implemented at a different point on the DAS network. For example, in an alternate embodiment, the lookup tables may be located at the LMUs. Yet alternatively, the steps to use the lookup table and/or the lookup table may be implemented using combination of hardware and firmware, which allows a user to speed up the lookup process.

Location Calculation System

Figure 7:
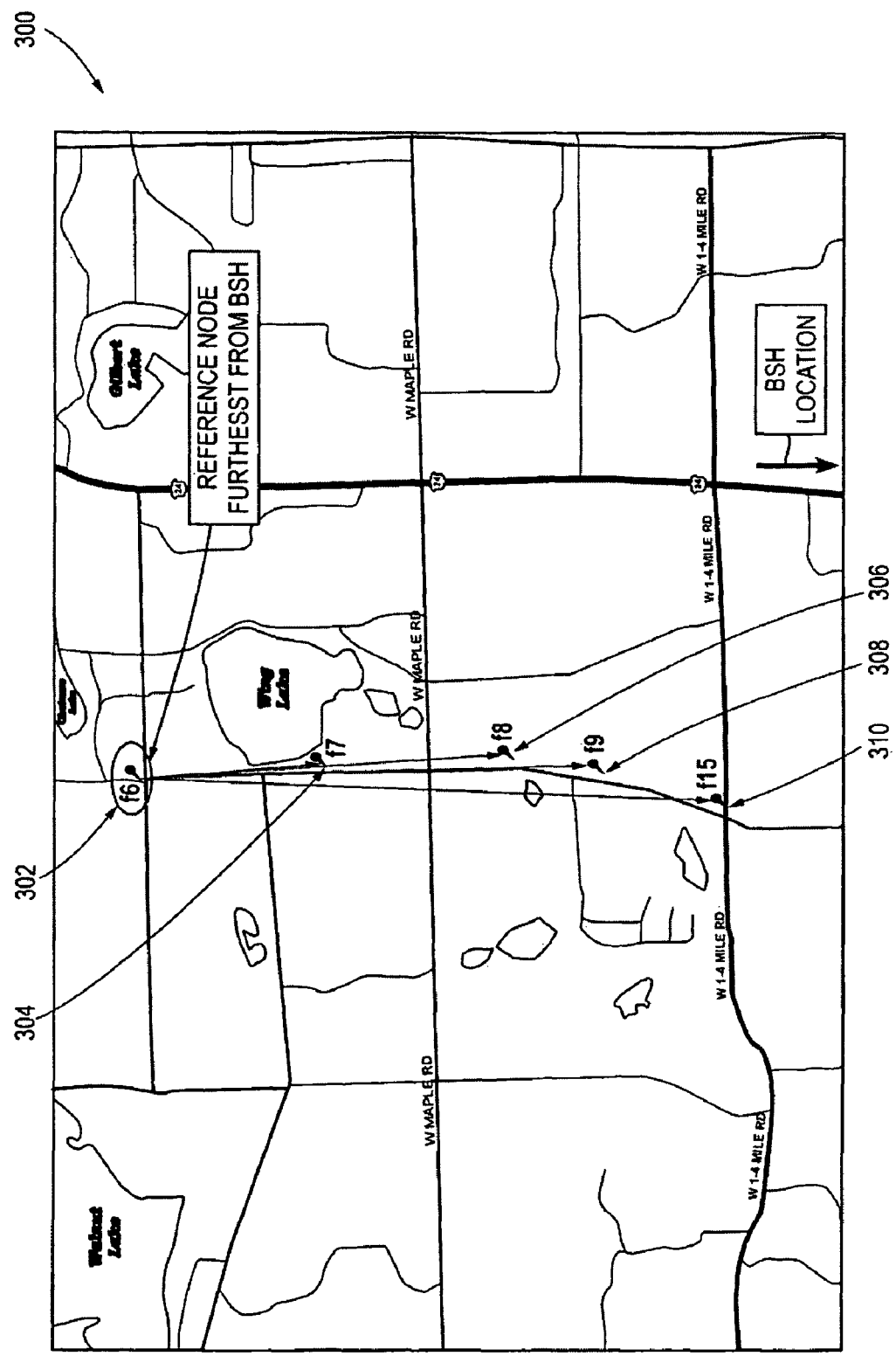
FIG. 7 illustrates a layout for a sample DAS simulcast sector.

FIG. 7 illustrates a layout for a sample DAS simulcast sector 300, which includes a number of DAS nodes F6 (302), F7 (304), F8 (306), F9 (308) and F15 (310). Node F6 302 in this sector 300 is furthest from the base station hotel (BSH) (not shown here) connected to the various DAS nodes and therefore has the highest fiber delay. On the other hand, node F15 310 is the closest to the BSH and has the lowest fiber delay. In an embodiment of the location calculation system disclosed herein, the RF delay of each node from the reference node F6 302 is calculated based on the straight line distance measurements of the other nodes from the reference node F6 302. The fiber delay of each of the nodes is calculated using the actual optical time domain reflector (OTDR) measurements of such nodes from the BSH.

Figure 8:
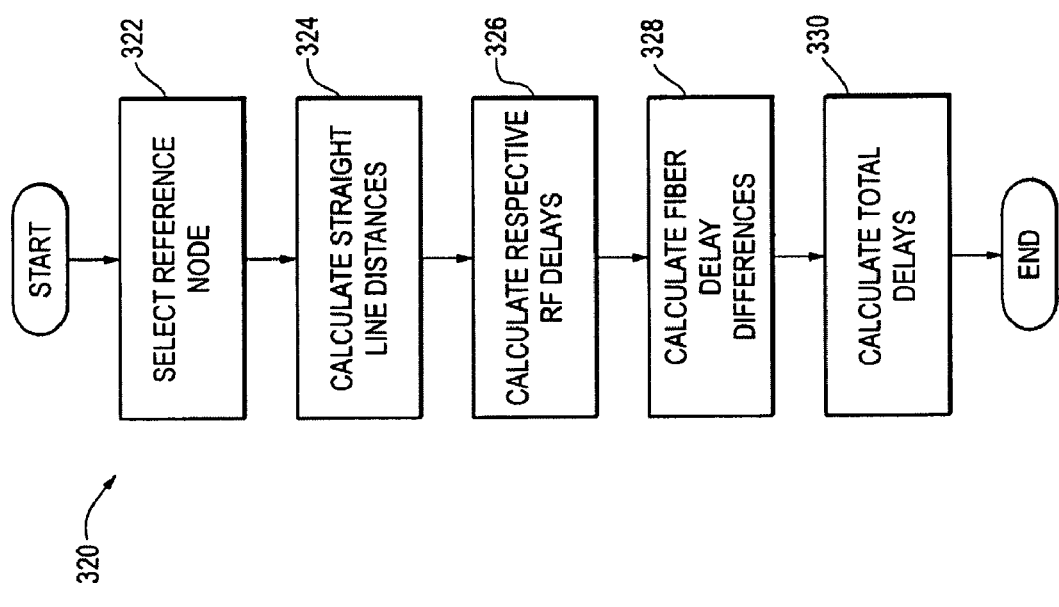
FIG. 8 illustrates a block diagram of a method used for normalizing simulcasting nodes in a DAS simulcast sector.

FIG. 8 illustrates a flowchart of a normalization program 320 used for normalizing simulcasting nodes in a DAS simulcast sector. The normalization program 320 illustrated may be implemented by using one or more computer of other devices located on the network 10 or in any other manner known to one of ordinary skill in the art.

First, a block 322 of the normalization program 320 selects a node with the highest fiber delay fro the BSH as the reference node. For example, for the simulcast sector 300, the block 322 may select the node F6 302 to be the reference node. Once the reference node is selected, that node's latitude/longitude may be used as the reference latitude/longitude for all location calculations for the simulcast sector 300. Moreover, the reference node's fiber delay may be used as the base delay for normalizing the sector 300.

Subsequently, a block 324 calculates the straight line distance between the reference node and each other node in the simulcast sector 300. A block 326 uses the distances calculated at block 324 to calculate the respective RF delay of each other nodes. Such RF delays are tabulated in columns 3 and 4 of the table II below.

TABLE II

| 1 Node | 2 Measured Fiber Delay from BSH | 3 Distance in meters from Ref, Node (F6) | 4 Calculated RF Delay | 5 Added delay (Fiber Delay Dist. From Ref. Node) | 6 Delay to Add (RF Delay + Add Fiber Delay) | 7 Total Delay |
|---|---|---|---|---|---|---|
| F-6 | 56.8 | 0 | 0 | 0.0 | 0.0 | 56.8 |
| F-7 | 48.8 | 1006.7 | 3.0 | 8.0 | 11.0 | 59.8 |
| F-8 | 39.4 | 2063.3 | 6.2 | 17.4 | 23.6 | 63.0 |
| F-9 | 29.5 | 2508.9 | 7.5 | 27.3 | 34.9 | 64.4 |
| F-15 | 18.5 | 3266.3 | 9.8 | 38.3 | 48.1 | 66.6 |

Subsequently a block 328 calculates the fiber delay differences of the other simulcast nodes 304-310. Such fiber delay differences are tabulated in column 5 of table II above. Then a block 330 adds the RF delay and the fiber delay difference for each of the simulcast nodes 302-310. These results give the calculated delays that may be added to each of the respective nodes, as tabulated in column 6 of the table II above.

These calculated delays (column 6) plus the already known fiber delay of each node (column 2) will provide the total delay which may be used to normalize the DAS nodes 302-310 of the simulcast sector 300 to the network. Such total delays are tabulated above in column 7 of table II.

Once the total delays are calculated, these delays may be used to calculate the transmission (Tx), reception (Rx) and maximum differential delays for use in synchronizing the simulcast sector 300 to the network.

In the above embodiment, the measured fiber delay difference between the closest node F15 310 and the fiber delay of the furthest node F6 302 is 38.3 micro seconds. For location calculations, one latitude/longitude is chosen as the reference latitude/longitude for the sector 300. Without this solution, whatever location was selected as the reference latitude/longitude and when a location request is made, the timing measurement for location calculation purposes could be skewed by the differential difference of the reference calculation and the where the mobile call is placed. This error, from a timing perspective could be as large as 38.3 microseconds.

By employing the above solution, the differential distance between the closest node F15 310 and the furthest node F6 302 is reduced significantly to 9.8 microseconds (66.6-58.6, as per column 7 of table II). This corresponds to the RF delay from node F6 302 to node F15 310. As a result, for location purposes, the timing measurement from any mobile on the simulcasting sector will mimic the RF delay from the mobile's location to the reference location.

In view of the many possible embodiments to which the principles of this patent may be applied, it should be recognized that the embodiments described herein with respect to the drawing figures are meant to be illustrative only and should not be taken as limiting the scope of patent. For example, for performance reasons one or more components of the method of the present patent may be implemented in hardware, rather than in software. Therefore, the patent as described herein contemplates all such embodiments as may come within the scope of the following claims and equivalents thereof.

What is claimed is:

1. A processing system for normalizing simulcast antenna nodes of a distributed antenna system (DAS) within a DAS simulcast sector, the processing system comprising:
   a processor communicatively connected to a distributed antenna system in which each given simulcast antenna node of a plurality of simulcast antenna nodes has a respective fiber delay corresponding to a propagation delay on a respective, distinct communication fiber connecting the given simulcast antenna node to a base station hotel (BSH);
   a memory communicatively connected to the processor and adapted to store a computer program that when executed by the processor causes the system to carry out functions comprising:
      selecting a reference simulcast antenna node within the DAS simulcast sector from among the plurality of simulcast antenna nodes;
      calculating a respective radio frequency (RF) delay for each simulcast antenna node of the plurality of simulcast antenna nodes;
      calculating a respective fiber delay difference of between the respective fiber delay of each simulcast antenna node and the respective fiber delay of the reference simulcast antenna node;
      computing a respective differential delay for each simulcast antenna node by adding the respective RF delay and the respective fiber delay difference corresponding to each simulcast antenna node; and
      calculate the calculating a respective total delay for each simulcast antenna node by adding the result of the fourth respective differential delay to the respective fiber delay of each simulcast antenna node.

2. The processing system of claim 1, wherein calculating the respective RF delay for each simulcast antenna node comprises calculating a straight line distance between the simulcast antenna node and the reference simulcast antenna node.

3. The processing system of claim 1, wherein calculating the respective fiber delay difference comprises determining the respective fiber delay of each given simulcast antenna node of the plurality of simulcast antenna nodes from optical time domain reflector (OTDR) measurements of the given simulcast antenna node from the BSH.

4. The processing system of claim 1, wherein the functions further comprise using the respective total delay of each simulcast antenna node to calculate at least one of a transmission delay, a reception delay, and a maximum differential delay of the DAS simulcast sector.

5. The processing system of claim 4, wherein the functions further comprise synchronizing the DAS simulcast sector to at least one of (1) a CDMA network, (2) a GSM based cellular network, and (3) a TDMA based cellular network, based on the calculated at least one of a transmission delay, a reception delay, and a maximum differential delay of the DAS simulcast sector.

6. The processing system of claim 1, wherein the DAS simulcast sector is connected to at least one of an 802.11 wireless data network and an 802.16 wireless data network.

7. A method of normalizing a plurality of simulcast antenna nodes of a distributed antenna system (DAS) within a DAS simulcast sector, the method comprising:
 determining a respective fiber delay for each given simulcast antenna node of the plurality of simulcast antenna nodes by measuring a propagation delay on a respective, distinct communication fiber connecting the given simulcast antenna node to a base station hotel (BSH);
 selecting a reference simulcast antenna node within the simulcast sector from among the plurality of simulcast antenna nodes;
 calculating a respective radio frequency (RF) delay for each simulcast antenna node of the plurality of simulcast antenna nodes;
 calculating a respective fiber delay difference between the respective fiber delay of each simulcast antenna node and the respective fiber delay of the reference simulcast antenna node;
 computing a respective differential delay for each simulcast antenna node by adding the respective RF delay and the respective fiber delay difference corresponding to each simulcast antenna node; and
 calculating a respective total delay for each simulcast antenna node by adding the respective differential delay to the respective fiber delay of each simulcast antenna node.

8. The method of claim 7, wherein calculating respective radio frequency (RF) delay for each simulcast antenna node comprises calculating a straight line distance between the simulcast antenna node and the reference simulcast antenna node.

9. The method of claim 7, wherein measuring the propagation delay on the respective, distinct communication fiber comprises using domain reflector (OTDR) to measure the given simulcast antenna node from the BSH.

10. The method of claim 7, further comprising using the respective total delay of each simulcast antenna node to calculate at least one of a transmission delay, a reception delay and a maximum differential delay of the DAS simulcast sector.

11. The method of claim 10, further comprising synchronizing the DAS simulcast sector to at least one of (1) a CDMA network, (2) a GSM based cellular network, and (3) a TDMA based cellular network, based on the calculated at least one of a transmission delay, a reception delay, and a maximum differential delay of the DAS simulcast sector.

12. The method of claim 7, wherein the DAS simulcast sector is connected to at least one of an 802.11 wireless data network and an 802.16 wireless data network.

13. A non-transitory computer readable medium having instructions stored thereon that, when executed by a processor of a processing system, cause the processing system to carry out functions comprising:
 determining a respective fiber delay for each given simulcast antenna node of a plurality of simulcast nodes of a distributed antenna system (DAS) within a DAS simulcast sector, wherein the processing system is configured to communicate with the DAS, and wherein the respective fiber delay corresponds to a propagation delay on a respective, distinct communication fiber connecting the given simulcast antenna node to a base station hotel (BSH);
 selecting a reference simulcast antenna node within the DAS simulcast sector from among the plurality of simulcast antenna nodes;
 calculating a respective radio frequency (RF) delay for each simulcast antenna node of the plurality of simulcast antenna nodes;
 calculating a respective fiber delay difference between the respective fiber delay of each simulcast antenna node and the respective fiber delay of the reference simulcast antenna node;
 computing a respective differential delay for each simulcast antenna node by adding the respective RF delay and the respective fiber delay difference corresponding to each simulcast antenna node; and
 calculating a respective total delay for each of the simulcast antenna node by adding the respective differential delay to the respective fiber delay of each simulcast antenna node.

14. The non-transitory computer readable medium of claim 13, wherein the calculating the respective RF delay for each simulcast antenna node comprises calculating a straight line distance between the simulcast antenna node and the reference simulcast antenna node.

15. The non-transitory computer readable medium of claim 13, wherein calculating the respective fiber delay difference comprises determining the respective fiber delay of each given simulcast antenna node of the plurality of simulcast nodes from optical time domain reflector (OTDR) measurements of the given simulcast antenna node from the BSH.

16. The non-transitory computer readable medium of claim 13, wherein the functions further comprise using the respective total delay of each simulcast antenna node to calculate at least one of a transmission delay, a reception delay, and a maximum differential delay of the DAS simulcast sector.

17. The non-transitory computer readable medium of claim 16, wherein the functions further comprise synchronizing the DAS simulcast sector to at least one of (1) a CDMA network, (2) a GSM based cellular network, and (3) a TDMA based cellular network, based on the calculated at least one of a transmission delay, a reception delay, and a maximum differential delay of the DAS simulcast sector.

18. The non-transitory computer readable medium of claim 13, wherein the DAS simulcast sector is configured to be connected to at least one of an 802.11 wireless data network and an 802.16 wireless data network.

* * * * *